United States Patent
Wu et al.

(10) Patent No.: US 12,305,060 B2
(45) Date of Patent: May 20, 2025

(54) HIGH-TEMPERATURE RESISTANT, PEELABLE AND ANTI-CORROSION COATING, PREPARATION METHOD THEREFOR AND APPLICATION THEREOF

(71) Applicant: MARINE CHEMICAL RESEARCH INSTITUTE CO., LTD., Qingdao (CN)

(72) Inventors: Lianfeng Wu, Qingdao (CN); Gong Cheng, Qingdao (CN); Zhiyong Wang, Qingdao (CN); Xianming Wang, Qingdao (CN); Fei Wang, Qingdao (CN); Haifeng Lu, Qingdao (CN); Leilei Liu, Qingdao (CN); Sanchuan Wang, Qingdao (CN)

(73) Assignee: MARINE CHEMICAL RESEARCH INSTITUTE CO., LTD., Qingdao (CN)

( * ) Notice: Subject to any disclaimer, the term of this patent is extended or adjusted under 35 U.S.C. 154(b) by 0 days.

(21) Appl. No.: 18/966,066

(22) Filed: Dec. 2, 2024

(65) Prior Publication Data
US 2025/0122399 A1    Apr. 17, 2025

Related U.S. Application Data

(63) Continuation of application No. PCT/CN2023/093761, filed on May 12, 2023.

(30) Foreign Application Priority Data

Jun. 27, 2022    (CN) .......................... 2022107337773

(51) Int. Cl.
| | | |
|---|---|---|
| *C09D 121/00* | (2006.01) | |
| *C09D 5/08* | (2006.01) | |
| *C09D 7/20* | (2018.01) | |
| *C09D 7/61* | (2018.01) | |
| *C09D 7/63* | (2018.01) | |
| *C09D 7/65* | (2018.01) | |

(52) U.S. Cl.
CPC ........... *C09D 121/00* (2013.01); *C09D 5/084* (2013.01); *C09D 7/20* (2018.01); *C09D 7/61* (2018.01); *C09D 7/63* (2018.01); *C09D 7/65* (2018.01)

(58) Field of Classification Search
CPC ........ C09D 121/00; C09D 5/084; C09D 7/20; C09D 7/61; C09D 7/63; C09D 7/65
See application file for complete search history.

(56) References Cited

U.S. PATENT DOCUMENTS

| 5,143,949 A | 9/1992 | Grogan et al. | |
|---|---|---|---|
| 5,891,941 A | 4/1999 | Tanaka et al. | |
| 2011/0123807 A1* | 5/2011 | Jun .......................... | B01J 13/14 |
| | | | 428/407 |

FOREIGN PATENT DOCUMENTS

| CN | 101386763 A | | 3/2009 |
|---|---|---|---|
| CN | 101768403 A | | 7/2010 |
| CN | 101386763 B | * | 2/2012 |
| CN | 103555072 A | | 2/2014 |
| CN | 103740226 A | | 4/2014 |
| CN | 103923537 A | | 7/2014 |
| CN | 104387865 A | | 3/2015 |
| CN | 103923537 B | * | 4/2016 |
| CN | 115011178 A | | 9/2022 |
| WO | 1995018182 A1 | | 7/1995 |
| WO | 2001070834 A1 | | 9/2001 |

OTHER PUBLICATIONS

Notice of Allowance from CNIPA and Allowed Claims.
International search report.

* cited by examiner

*Primary Examiner* — Robert S Jones, Jr.
*Assistant Examiner* — Joshua Caleb Bledsoe

(57) ABSTRACT

A high-temperature resistant peelable anti-corrosion coating, a preparation method therefor and an application thereof are provided. The coating includes component A and component B; the component A includes film-forming substance, pigment and filler, auxiliary agent, and solvent A; the component B includes vulcanizing agent and solvent B; the component A includes the following components in parts by weight: 100 parts of film-forming substance; 25-55 parts of pigment and filler; 0.1-3 parts of adhesion modifier; 0.5-5 parts of auxiliary agent; 20-50 parts of solvent A; the component B includes the following components in parts by weight: 10-50 parts of vulcanizing agent; 100 parts of solvent B. The coating can be completely peeled off from the substrate after being subjected to a high temperature of 200° C. for 4 hours, without affecting the state of the substrate.

8 Claims, No Drawings

HIGH-TEMPERATURE RESISTANT, PEELABLE AND ANTI-CORROSION COATING, PREPARATION METHOD THEREFOR AND APPLICATION THEREOF

CROSS-REFERENCE

This application claims to the benefit of priority from Chinese Application No. 202210733777.3 with a filing date of Jun. 27, 2022. The content of the aforementioned applications, including any intervening amendments thereto, are incorporated herein by reference.

TECHNICAL FIELD

The present disclosure relates to the technical field of coating, in particular to a high-temperature resistant, peelable and anti-corrosion coating, a preparation method therefor and an application thereof.

BACKGROUND

Peelable coating is a temporary protective coating that has the functions of anti-fouling, anti-rust, anti-acid and alkali on the surface of the substrate. It also has the advantages of simple construction process, no special process requirements for the material surface, and good film-forming properties. It is widely used in electroplating, chemical milling protection, anti-fouling and other fields.

During the process of pasting the internal insulation layer, handling, and construction of solid rocket engines, the anti-corrosion and weather-proof coating sprayed on the surface is inevitably affected by bumps, pollution, and other factors that can affect its apparent quality. If the anti-corrosion and weather-proof coating is sprayed after the completion of the charge, it will be limited by the operating requirements of initiating explosive devices, resulting in long construction period, high safety risks, and high costs. Spraying a layer of high-temperature resistant and peelable coating on the surface of the existing anti-corrosion and weather-proof coating, which can be peeled off after the completion of the charge, can solve the above problems. In addition, the process of pasting the internal insulation layer requires a vulcanization step, which can even reach a temperature of 200° C. However, the peelable coatings currently used in the market exhibit thermal aging after being exposed to a high temperature environment of 200° C., the molecular chains of the film-forming resin will break, causing a sharp decrease in coating strength and an increase in adhesion to the substrate, resulting in the inability to peel off and damage to the protected substrate.

Equipment is often exposed to various environments and is subject to corrosion from natural media and industrial media. Natural media such as air, water, soil, and industrial media such as acids, alkalis, salts, and various organic compounds. Equipment covered by peelable coatings is at risk of corrosion damage, so peelable coatings must also have good anti-corrosion performance to ensure long-term use without problems.

The Chinese patent application No. CN101386763A discloses a peelable coating using vinyl resin and styrene-butadiene-styrene block copolymer (SBS) as the film former, which has good peelability but can only be used at or below 75° C.

The Chinese patent application No. CN106147486A relates to a waterborne polyacrylate peelable coating, which has the advantages of high mechanical strength, good acid and alkali resistance, and good water resistance, but the highest operating temperature is 80° C.

Therefore, developing a peelable coating with good peeling and anti-corrosion properties even after experiencing a high temperature environment of 200° C. has high economic value and social benefits.

SUMMARY

In order to solve the problems existing in the existing technology, the present disclosure provides a high-temperature resistant, peelable and anti-corrosion coating, a preparation method therefor and an application thereof. The coating of the present disclosure can be completely peeled off from the substrate after being subjected to a high temperature of 200° C. for 4 hours, without affecting the state of the substrate. The coating of the present disclosure is not only simple in process, easy to realize industrial production, but also has good stability, which is beneficial to the uniform coating of the coating on various substrates.

The first objective of the present disclosure is to provide a high-temperature resistant, peelable and anti-corrosion coating, which includes component A and component B;

the component A includes film-forming substance, pigment and filler, auxiliary agent, and solvent A;

the component B includes vulcanizing agent and solvent B;

the component A includes the following components in parts by weight:

| | |
|---|---|
| film-forming substance | 100 parts by weight; |
| pigment and filler | 25 to 55 parts by weight; |
| adhesion modifier | 0.1 to 3 parts by weight; |
| auxiliary agent | 0.5 to 5 parts by weight; |
| solvent A | 20 to 50 parts by weight; | the component B includes the following components in parts by weight:

| | |
|---|---|
| vulcanizing agent | 10 to 50 parts by weight; |
| solvent B | 100 parts by weight. |

Preferably, the component A includes the following components in parts by weight:

| | |
|---|---|
| film-forming substance | 100 parts by weight; |
| pigment and filler | 30 to 50 parts by weight; |
| adhesion modifier | 0.5 to 2 parts by weight; |
| auxiliary agent | 1 to 3 parts by weight; |
| solvent A | 25 to 40 parts by weight; | the component B includes the following components in parts by weight:

| | |
|---|---|
| vulcanizing agent | 15 to 40 parts by weight; |
| solvent B | 100 parts by weight. |

Preferably, the mass ratio of the component A and the component B is 100:(1-15); preferably 100:(2-10).

Preferably, the film-forming substance is fluororubber, specifically, it can be select from at least one of fluororubber L728A, fluororubber 2602, fluororubber 228, and fluororubber H228;

The adhesion modifier is a mixture of expandable microsphere and polytetrafluoroethylene micro powder, with a mass ratio of 10:(1-4);

The expandable microsphere has a core-shell structure, with thermoplastic polymer as a shell and liquid alkane gas encapsulated inside; the diameter range of the expandable microsphere is 10-100 μm.

Preferably, the pigment and filler includes reinforcing filler and anticorrosive filler; the reinforcing filler and anti-corrosion filler can be materials commonly used in this field. In the present disclosure, the preferred reinforcing filler is at least one of quartz powder, fumed silica, mica powder, mica flake, calcium carbonate, barium sulfate, titanium dioxide, kaolin, dolomite, wollastonite, carbon black, and phthalocyanine blue; the anticorrosive filler is at least one of talc powder, zinc oxide, zinc phosphate, and organic bentonite.

Preferably, auxiliary agent includes wetting dispersant and antifungal agent.

The wetting dispersant can use wetting dispersants commonly used in this field, such as DS-F20 wetting dispersant, DS-F63 wetting dispersant, RK-8230 wetting dispersant, OT-75 wetting dispersant, KYC-919 wetting dispersant;

The antifungal agent can use antifungal agents commonly used in this field, such as KEPUYIN-M27 antifungal agent, KEPUYIN-M23 antifungal agent, and KEPUYIN-M002 antifungal agent.

Preferably, the vulcanizing agent is at least one of bisphenol AF (2,2-bis(4-hydroxyphenyl)hexafluoropropane), hydroquinone, dicumyl peroxide (DCP), and 2,5-dimethyl-2,5-di(tert-butylperoxy)hexane.

Preferably, the solvent A is at least one of propylene glycol methyl ether acetate, xylene, and butyl acetate.

The solvent B is at least one of propylene glycol methyl ether acetate, xylene, and butyl acetate.

The solvent A and the solvent B can be the same or different.

Conventional auxiliary agents, such as BYK-163 wetting dispersant, BYK-P104 wetting dispersant, Nordes EPW antifungal agent, DeuAdd MB-16 antifungal agent, etc., can also be added to the formula of the disclosure according to the actual situation, and the dosage is conventional, and technicians can add them according to the actual situation.

The second objective of the present disclosure is to provide a preparation method of the high-temperature resistant peelable anti-corrosion coating, which includes:

Mixing the components of the component A according to the specified parts by weight to obtain the component A; mixing the components of the component B according to the specified parts by weight to obtain the component B, and mixing the component A and the component B according to the specified dosage to prepare the high-temperature resistant peelable anti-corrosion coating.

The third objective of the present disclosure is to provide an application of the the high-temperature resistant peelable anti-corrosion coating in protective coatings.

Specifically, the following scheme can be adopted:

After the component A and the component B is mixed, applying by brush coating, air spraying or high-pressure airless spraying, and curing at a high temperature of 160° C. for 2 hours after coating, so as to obtain a peelable and anti-corrosion coating with high temperature resistance of 200° C.

The present disclosure uses fluororubber as the film-forming substance, combined with pigment and filler, and auxiliary agent (including wetting dispersant, antifungal agent, and adhesion modifier, especially the selection of the adhesion modifier) to form component A in the presence of a solvent, and uses vulcanizing agent and solvent to form component B. Mixing the component A and the component B together to prepare a high-temperature resistant, peelable, and corrosion-resistant coating.

Fluororubber refers to a polymer elastomer with fluorine atoms attached to the carbon atoms in the main chain or side chain of molecules. It has excellent characteristics such as low surface energy, non adhesiveness, heat resistance, chemical resistance, oil resistance, and weather-proof property. As the film former of the present disclosure, it can meet the requirements of high temperature resistance, at the same time, its extremely low surface energy can give the coating with low adhesion to the substrate, meeting the requirements of peelability at room temperature.

The expandable microsphere has a core-shell structure, with thermoplastic polymer as the shell. The interior is generally encapsulated with liquid alkane gases (such as pentane, hexane, octane, heptane, etc.), and the diameter of the expandable microsphere is generally between 10-100 μm. The shell of the expandable microsphere has a certain degree of elasticity and airtightness. Heating the expandable microsphere, when the heating temperature is above the boiling point of the alkane gas wrapped in the expandable microsphere and reaches the glass transition temperature of the polymer shell of the expandable microsphere, the shell of the expandable microsphere softens and becomes plastic, and the gasification of gas inside the expandable microsphere increases the internal pressure, causing the polymer microsphere to expand until the expandable microsphere completely expands. At this point, the expandable microsphere shows good expansion and thermal stability, and when the expandable microsphere continue to be heated, the expandable microsphere breaks. When the microspheres fully expand, reducing the temperature. Because the shell of the polymer microsphere has a certain mechanical strength, so the shape of expandable microsphere will not change, maintaining the same volume and diameter as when the polymer microsphere fully expanded, but the density of the expandable microsphere decreases after thermal expansion.

The polytetrafluoroethylene powder, also known as polytetrafluoroethylene wax, is a white, low molecular weight polytetrafluoroethylene ultrafine powder. Its properties such as temperature, weather-proof property, chemical stability, self-lubrication and non adhesiveness are identical to the high molecular weight polytetrafluoroethylene resin. While maintaining its original properties, polytetrafluoroethylene micro powder also has the advantages of good dispersibility and easy mixing with other materials, which is an excellent additive, solid lubricant and release agent.

In the previous studies, it was found that adding expandable microsphere and polytetrafluoroethylene micro powder into the high temperature resistant peelable corrosion-resistant coating can exert synergistic effect and adjust the adhesive strength between the coating and the substrate. After further extensive experimental screening, it was found that when the ratio of the expandable microsphere to polytetrafluoroethylene micro powder is 4:1, good peelability can be achieved. This not only avoids the problem of the coating being unable to completely peel off from the substrate after high temperature, but also provides a certain peel strength between the coating and the substrate, avoiding external forces that may cause the coating to peel off, achieving unexpected results.

After analyzing the relative mechanisms, it was found that: ① After the coating is heated, the volume of the expandable microsphere increases, causing the coating to detach from the substrate. After cooling, the volume of the expandable microsphere is unchanged, reducing the adhesion between the substrate and the coating. ② The low surface energy and non adhesiveness of the polytetrafluoroethylene micro powder can also reduce the adhesion between the coating and the substrate; ③ The combination of the expandable microsphere and the polytetrafluoroethylene micro powder can solve the problem of traditional coatings becoming unable to peel off from the substrate due to increased adhesion after being subjected to high temperature.

The present disclosure has the following advantageous effects:

(1) The coating of the present disclosure can be completely peeled off from the substrate after being subjected to a high temperature of 200° C. for 4 hours, without affecting the state of the substrate.

(2) The coating of the present disclosure not only has a simple process and is easy to achieve industrial production, but also has good stability, which is conducive to the uniform coating of the coating on various substrates.

(3) The fluororubber of the present disclosure can meet various complex working conditions due to its unique properties, such as low surface energy and non adhesiveness, heat resistance, chemical resistance, oil resistance, and weather-proof property. Moreover, the fluororubber reinforced with filler has high elongation at break and mechanical strength, as well as excellent anti-corrosion performance.

(4) The expandable microsphere of the adhesion modifier of the present disclosure is thermoplastic hollow polymer microsphere. After being heated, the volume and the diameter of the expandable microsphere will increase, resulting in gaps between the coating and the substrate, reducing the adhesion between the coating and the substrate. Therefore, by adjusting its dosage, the adhesion of the coating on different substrates can be controlled.

The color of the coating of the present disclosure can be adjusted according to user needs, and can be made transparent or semi-transparent without masking the identification of the protected product, making it easy to distinguish the protected product.

DETAILED DESCRIPTION OF THE EMBODIMENTS

Below is a specific description of the present disclosure based on specific embodiments. It is necessary to point out that the following embodiments are only used for further explanation of the present disclosure and cannot be understood as limiting the protection scope of the present disclosure. Some non-essential improvements and adjustments made by those skilled in the art based on the content of the present disclosure still fall within the protection scope of the present disclosure.

In various embodiments of the present disclosure, the film-forming substance, pigment and filler, solvent, auxiliary agent and other raw material are conventional commercially available products. The specific information is shown in Table 1:

TABLE 1

| Number | Raw material | Model specification | Manufacturer |
|---|---|---|---|
| 1 | Fluororubber | L728A | Zhejiang Fluorine Chemical New Material Co., Ltd. |
| 2 | Fluororubber | 2602 | Zhejiang Fluorine Chemical New Material Co., Ltd. |
| 3 | Fluororubber | 228 | Zhejiang Fluorine Chemical New Material Co., Ltd. |
| 4 | Fluororubber | H228 | Zhejiang Fluorine Chemical New Material Co., Ltd. |
| 5 | Quartz powder | Industrial grade | Anmi Anywhere New Materials Co., Ltd. |
| 6 | Fumed silica | T-3000 | Liaocheng sailike new material co. LTD |
| 7 | Mica powder | Industrial grade | Jiangxi KingPowder New Material Co., Ltd. |
| 8 | Mica flake | Industrial grade | Shijiazhuang Tengbang Mineral Products Co., Ltd. |
| 9 | Calcium carbonate | Industrial grade | Hebei Songshi Building Materials Co., Ltd. |
| 10 | Barium sulfate | Industrial grade | Jiangyin Guangyuan Micro-tiny Powder Co., Ltd. |
| 11 | Titanium dioxide | HA120 | Nanyang Hengxiang Chemical Products Co., Ltd. |
| 12 | Kaolin | Industrial grade | Lingshou County Baishun Mineral Products Co., Ltd. |
| 13 | Dolomite | Industrial grade | Shouxin Mineral Products Processing Plant, Pailou Town, Haicheng City |
| 14 | Wollastonite | Industrial grade | Shanghai Tianhan Mineral Technology Co., Ltd. |
| 15 | Carbon black | LT043 | Shanghai Lantu Chemical Co., Ltd. |
| 16 | Phthalocyanine blue | LT156 | Shanghai Lantu Chemical Co., Ltd. |
| 17 | Talcum powder | Industrial grade | Pingdu Zhaohui Fine Powder Co., Ltd |
| 18 | Zinc oxide | Analytical pure | Sinopharm Chemical Reagent Co., Ltd. |
| 19 | Zinc phosphate | Analytical pure | Sinopharm Chemical Reagent Co., Ltd. |
| 20 | Organic bentonite | Industrial grade | Ruitai Chemical Products Trading Company, Jinshui District, Zhengzhou City |

TABLE 1-continued

| Number | Raw material | Model specification | Manufacturer |
|---|---|---|---|
| 21 | Expandable microsphere | 105D | Foshan Jieheng New Materials Co., Ltd. |
| 22 | polytetrafluoroethylene micro powder | Industrial grade | GuangZhou Shinshi Metallurgical and Chemical CO., LTD |
| 23 | Antifungal agent | KEPUYIN-M27 | Foshan Kepu Yin Biotechnology Co., Ltd. |
| 24 | Antifungal agent | KEPUYIN-M23 | Foshan Kepu Yin Biotechnology Co., Ltd. |
| 25 | Antifungal agent | KEPUYIN-M002 | Foshan Kepu Yin Biotechnology Co., Ltd. |
| 26 | Bisphenol AF (2,2-bis(4-hydroxyphenyl)hexafluoropropane) | Analytical pure | Sinopharm Chemical Reagent Co., Ltd. |
| 27 | Hydroquinone | Analytical pure | Sinopharm Chemical Reagent Co., Ltd. |
| 28 | Dicumyl peroxide | Analytical pure | Sinopharm Chemical Reagent Co., Ltd. |
| 29 | 2,5-dimethyl-2,5-di(tert-butylperoxy)hexane | Analytical pure | Sinopharm Chemical Reagent Co., Ltd. |
| 30 | Propylene glycol methyl ether acetate | Industrial grade | Tianjin Fuyu Fine Chemical Co., Ltd. |
| 31 | Xylene | Industrial grade | Tianjin Fuyu Fine Chemical Co., Ltd. |
| 32 | Butyl acetate | Industrial grade | Tianjin Fuyu Fine Chemical Co., Ltd. |
| 33 | Wetting dispersant | DS-F20 | Dongguan DENSON New Materials Co., Ltd. |
| 34 | Wetting dispersant | DS-F63 | Dongguan DENSON New Materials Co., Ltd. |
| 35 | Wetting dispersant | OT-75 | Guangzhou Huixiang Chemical Co., Ltd. |
| 36 | Wetting dispersant | KYC-919 | Guangzhou Yangu Trading Co.,Ltd |

Embodiment 1

A high-temperature resistant, peelable and anti-corrosion coating is composed of the following raw materials in parts by weight: in component A, 100 parts of fluororubber L728A, 20 parts of fumed silica, 10 parts of quartz powder, 5 parts of mica flakes, 5 parts of talcum powder, 7 parts of zinc phosphate, 1 part of carbon black, 1 part of expandable microsphere, 0.2 parts of polytetrafluoroethylene micro powder, 1 part of antifungal agent KEPUYIN-M27, 1 part of DS-F20 wetting dispersant, and 34 parts of propylene glycol methyl ether acetate; in component B, 20 parts of bisphenol AF (2,2-bis(4-hydroxyphenyl)hexafluoropropane) and 100 parts of propylene glycol methyl ether acetate.

The preparation method of the high-temperature resistant, peelable and anti-corrosion coating includes the following steps:
S1: adding fluororubber L728A, fumed silica, quartz powder, mica flake, talcum powder, zinc phosphate, carbon black, polytetrafluoroethylene micro powder, and propylene glycol methyl ether acetate into a high-speed mixer and mixing evenly without agglomeration;
S2: pouring the evenly mixed coating material into a basket mill and grinding the coating material to a fineness of 40 μm;
S3: adding expandable microsphere, antifungal agent, and wetting dispersant and mixing evenly to obtain the component A of high-temperature resistant, peelable and anti-corrosion coating;
S4: mixing bisphenol AF (2,2-bis(4-hydroxyphenyl) hexafluoropropane) with propylene glycol methyl ether acetate evenly using a high-speed mixer to obtain the component B of the high-temperature resistant, peelable and anti-corrosion coating;
S5: mixing evenly 100 parts by weight of the component A with 10 parts by weight of the component B, applying by brush coating, air spraying or high-pressure airless spraying, and curing at a high temperature of 160° C. for 2 hours after coating, so as to obtain a high-temperature resistant, peelable and anti-corrosion coating.

Performance tests were conducted on the coating prepared in Embodiment 1. The elongation at break and the tensile strength at break of the coating were tested according to the GB/T 528-2009 standard, the water resistance of the coating was tested according to the GB/T 1733-1993 standard, the high-temperature resistance of the coating was tested according to the GB/T 1735-2009 standard, the fungus resistance of the coating was tested according to the GJB 150.10A-2009 standard, and the salt-fog test, of the coating was tested according to the GJB 150.11A-2009 standard. The test results are shown in Table 2:

TABLE 2

| Number | Experimental project | Test result |
|---|---|---|
| 1 | coating film appearance | black |
| 2 | tensile strength at break, MPa | 8.2 |
| 3 | elongation at break, % | 430 |
| 4 | water resistance test at 23° C. ± 2° C., 24 h | the coating film is intact, without bubbles or peeling |
| 5 | high-temperature resistance test at 200° C. ± 2° C., 4 h | the coating film is intact, without bubbles or peeling |
| 6 | fungus resistance test, 28 d | 0 class |
| 7 | peel test (peel off at room temperature after 200° C./4 hours) | good peelability |
| 8 | salt-fog test, 500 h | the coating film is intact, without bubbles or peeling |

Embodiment 2

A high-temperature resistant, peelable and anti-corrosion coating is composed of the following raw materials in parts by weight: in component A, 100 parts of fluororubber 2602, 20 parts of calcium carbonate, 5 parts of titanium dioxide, 10 parts of talcum powder, 0.5 parts of expandable microsphere, 0.2 parts of polytetrafluoroethylene micro powder, 1 part of mold antifungal agent KEPUYIN-M23, 0.5 parts of DS-F63 wetting dispersant, and 30 parts of propylene glycol methyl ether acetate; in component B, 30 parts of dicumyl peroxide (DCP) and 100 parts of xylene.

The preparation method of the high-temperature resistant, peelable and anti-corrosion coating includes the following steps:

S1: adding fluororubber 2602, calcium carbonate, titanium dioxide, talcum powder, polytetrafluoroethylene micro powder, and propylene glycol methyl ether acetate into a high-speed mixer and mixing evenly without agglomeration;

S2: pouring the evenly mixed coating material into a basket mill and grinding the coating material to a fineness of 40 μm;

S3: adding expandable microsphere, antifungal agent, and wetting dispersant and mixing evenly to obtain the component A of high-temperature resistant, peelable and anti-corrosion coating;

S4: mixing dicumyl peroxide (DCP) with xylene evenly using a high-speed mixer to obtain the component B of the high-temperature resistant, peelable and anti-corrosion coating;

S5: mixing 100 parts by weight of the component A with 3 parts by weight of the component B, applying by brush coating, air spraying or high-pressure airless spraying, and curing at a high temperature of 160° C. for 2 hours to a high-temperature resistant, peelable and anti-corrosion coating.

Performance tests were conducted on the coating prepared in Embodiment 2. The testing method refers to the testing method in Embodiment 1. The test results are shown in Table 3:

TABLE 3

| Number | Experimental project | Test result |
|---|---|---|
| 1 | coating film appearance | black |
| 2 | tensile strength at break, MPa | 7.6 |
| 3 | elongation at break, % | 450 |
| 4 | water resistance test at 23° C. ± 2° C., 24 h | the coating film is intact, without bubbles or peeling |
| 5 | high-temperature resistance test at 200° C. ± 2° C., 4 h | the coating film is intact, without bubbles or peeling |
| 6 | fungus resistance test, 28 d | 0 class |
| 7 | peel test (peel off at room temperature after 200° C./4 hours) | good peelability |
| 8 | salt-fog test, 500 h | the coating film is intact, without bubbles or peeling |

Embodiment 3

A high-temperature resistant, peelable and anti-corrosion coating is composed of the following raw materials in parts by weight: in component A, 100 parts of fluororubber 228, 5 parts of fumed silica, 3 parts of barium sulfate, 5 parts of wollastonite, 7 parts of zinc phosphate, 10 parts of organic bentonite, 1.5 parts of expandable microsphere, 0.4 parts of polytetrafluoroethylene micro powder, 1 part of phthalocyanine blue, 0.5 parts of antifungal agent KEPUYIN-M002, 0.5 parts of DS-F63 wetting dispersant, and 40 parts of butyl acetate; in component B, 25 parts of bisphenol AF (2,2-bis(4-hydroxyphenyl)hexafluoropropane) and 100 parts of xylene.

The preparation method of the high-temperature resistant, peelable and anti-corrosion coating includes the following steps:

S1: adding fluororubber 228, fumed silica, barium sulfate, wollastonite, zinc phosphate, organic bentonite, polytetrafluoroethylene micro powder, phthalocyanine blue, and butyl acetate into a high-speed mixer and mixing evenly without agglomeration;

S2: pouring the evenly mixed coating material into a basket mill and grinding the coating material to a fineness of 40 μm;

S3: adding expandable microsphere, antifungal agent, and wetting dispersant and mixing evenly to obtain the component A of high-temperature resistant, peelable and anti-corrosion coating;

S4: mixing bisphenol AF (2,2-bis(4-hydroxyphenyl)hexafluoropropane) with xylene evenly using a high-speed mixer to obtain the component B of the high-temperature resistant, peelable and anti-corrosion coating;

S5: mixing 100 parts by weight of the component A with 3 parts by weight of the component B, applying by brush coating, air spraying or high-pressure airless spraying, and curing at a high temperature of 160° C. for 2 hours to a high-temperature resistant, peelable and anti-corrosion coating.

Performance tests were conducted on the coating prepared in Embodiment 3. The testing method refers to the testing method in Embodiment 1. The test results are shown in Table 4:

TABLE 4

| Number | Experimental project | Test result |
|---|---|---|
| 1 | coating film appearance | Blue |
| 2 | tensile strength at break, MPa | 7.6 |
| 3 | elongation at break, % | 430 |
| 4 | water resistance test at 23° C. ± 2° C., 24 h | the coating film is intact, without bubbles or peeling |
| 5 | high-temperature resistance test at 200° C. ± 2° C., 4 h | the coating film is intact, without bubbles or peeling |
| 6 | fungus resistance test, 28 d | 0 class |
| 7 | peel test (peel off at room temperature after 200° C./4 hours) | good peelability |
| 8 | salt-fog test, 500 h | the coating film is intact, without bubbles or peeling |

Embodiment 4

A high-temperature resistant, peelable and anti-corrosion coating is composed of the following raw materials in parts by weight: in component A, 50 parts of fluororubber H228, 50 parts of fluororubber 228, 10 parts of fumed silica, 7 parts of kaolin, 10 parts of talcum powder, 7 parts of organic bentonite, 1.4 parts of expandable microsphere, 0.4 parts of polytetrafluoroethylene micro powder, 1 part of OT-75 wetting dispersant, 0.7 parts of antifungal agent KEPUYIN-M27, and 25 parts of xylene; in component B, 15 parts of 2,5-dimethyl-2,5-di(tert-butylperoxy)hexane (DBPMH) and 100 parts of butyl acetate.

The preparation method of the high-temperature resistant, peelable and anti-corrosion coating includes the following steps:

S1: adding fluororubber H228, fluororubber 228, fumed silica, kaolin, talcum powder, organic bentonite, polytetrafluoroethylene micro powder, and xylene into a high-speed mixer and mixing evenly without agglomeration;

S2: pouring the evenly mixed coating material into a basket mill and grinding it to a fineness of 40 μm;

S3: adding expandable microsphere, antifungal agent, and wetting dispersant and mixing evenly to obtain the component A of high-temperature resistant, peelable and anti-corrosion coating;

S4: mixing 2,5-dimethyl-2,5-di(tert-butylperoxy)hexane (DBPMH) with butyl acetate evenly using a high-speed mixer to obtain the component B of the high-temperature resistant, peelable and anti-corrosion coating;

S5: mixing 100 parts by weight of the component A with 5 parts by weight of the component B, applying by brush coating, air spraying, or high-pressure airless spraying, and curing at a high temperature of 160° C. for 2 hours to a high-temperature resistant, peelable and anti-corrosion coating.

Performance tests were conducted on the coating prepared in Embodiment 4. The testing method refers to the testing method in Embodiment 1. The test results are shown in Table 5:

TABLE 5

| Number | Experimental project | Test result |
|---|---|---|
| 1 | coating film appearance | white |
| 2 | tensile strength at break, MPa | 7.7 |
| 3 | elongation at break, % | 463 |
| 4 | water resistance test at 23° C. ± 2° C., 24 h | the coating film is intact, without bubbles or peeling |
| 5 | high-temperature resistance test at 200° C. ± 2° C., 4 h | the coating film is intact, without bubbles or peeling |
| 6 | fungus resistance test, 28 d | 0 class |
| 7 | peel test (peel off at room temperature after 200° C./4 hours) | good peelability |
| 8 | salt-fog test, 500 h | the coating film is intact, without bubbles or peeling |

Embodiment 5

A high-temperature resistant, peelable and anti-corrosion coating is composed of the following raw materials in parts by weight: in component A, 30 parts of fluororubber L728A, 70 parts of fluororubber H228, 10 parts of fumed silica, 10 parts of mica powder, 10 parts of dolomite, 10 parts of zinc oxide, 1.25 parts of expandable microsphere, 0.25 parts of polytetrafluoroethylene micro powder, 0.3 parts of KYC-919 wetting dispersant, 1 part of antifungal agent KEPUYIN-M23, and 40 parts of xylene; in component B, 20 parts of hydroquinone and 100 parts of propylene glycol methyl ether acetate.

The preparation method of the high-temperature resistant, peelable and anti-corrosion coating includes the following steps:

S1: adding fluororubber L728A, fluororubber H228, fumed silica, mica powder, dolomite, zinc oxide, polytetrafluoroethylene micro powder, and xylene into a high-speed mixer and mixing evenly without agglomeration;

S2: pouring the evenly mixed coating material into a basket mill and grinding it to a fineness of 40 μm;

S3: adding expandable microsphere, antifungal agent, and wetting dispersant and mixing evenly to obtain the component A of high-temperature resistant, peelable and anti-corrosion coating;

S4: mixing hydroquinone with propylene glycol methyl ether acetate evenly using a high-speed mixer to obtain the component B of the high-temperature resistant, peelable and anti-corrosion coating;

S5: mixing 100 parts by weight of the component A with 6 parts by weight of the component B, applying by brush coating, air spraying, or high-pressure airless spraying, and curing at a high temperature of 160° C. for 2 hours after coating, so as to obtain a high-temperature resistant, peelable and anti-corrosion coating.

Performance tests were conducted on the coating prepared in Embodiment 5. The testing method refers to the testing method in Embodiment 1. The test results are shown in Table 6:

TABLE 6

| Number | Experimental project | Test result |
|---|---|---|
| 1 | coating film appearance | white |
| 2 | tensile strength at break, MPa | 7.2 |
| 3 | elongation at break, % | 482 |
| 4 | water resistance test at 23° C. ± 2° C., 24 h | the coating film is intact, without bubbles or peeling |
| 5 | high-temperature resistance test at 200° C. ± 2° C., 4 h | the coating film is intact, without bubbles or peeling |
| 6 | fungus resistance test, 28 d | 0 class |
| 7 | peel test (peel off at room temperature after 200° C./4 hours) | good peelability |
| 8 | salt-fog test, 500 h | the coating film is intact, without bubbles or peeling |

Embodiment 6

A high-temperature resistant, peelable and anti-corrosion coating is composed of the following raw materials in parts by weight: in component A, 20 parts of fluororubber 2602, 80 parts of fluororubber H228, 12 parts of mica powder, 13 parts of barium sulfate, 20 parts of zinc phosphate, 1.15 parts of expandable microsphere, 0.35 parts of polytetrafluoroethylene micro powder, 1 part of DS-F20 wetting dispersant, 2 parts of antifungal agent KEPUYIN-M23, and 35 parts of xylene; in component B, 40 parts of hydroquinone and 100 parts of xylene.

The preparation method of the high-temperature resistant, peelable and anti-corrosion coating includes the following steps:

S1: adding fluororubber 2602, fluororubber H228, mica powder, barium sulfate, zinc phosphate, polytetrafluoroethylene micro powder, and xylene into a high-speed mixer and mixing evenly without agglomeration;

S2: pouring the evenly mixed coating material into a basket mill and grinding the coating material to a fineness of 40 μm;

S3: adding expandable microsphere, antifungal agent and wetting dispersant and mixing evenly to obtain the component A of high-temperature resistant, peelable and anti-corrosion coating;

S4: mixing hydroquinone with xylene evenly using a high-speed mixer to obtain the component B of the high-temperature resistant, peelable and anti-corrosion coating;

S5: mixing 100 parts by weight of the component A with 2 parts by weight of the component B, applying by brush coating, air spraying, or high-pressure airless spraying, and curing at a high temperature of 160° C.

for 2 hours after coating, so as to obtain a high-temperature resistant, peelable and anti-corrosion coating.

Performance tests were conducted on the coating prepared in Embodiment 6. The testing method refers to the testing method in Embodiment 1. The test results are shown in Table 7:

TABLE 7

| Number | Experimental project | Test result |
|---|---|---|
| 1 | coating film appearance | white |
| 2 | tensile strength at break, MPa | 7.4 |
| 3 | elongation at break, % | 500 |
| 4 | water resistance test at 23° C. ± 2° C., 24 h | the coating film is intact, without bubbles or peeling |
| 5 | high-temperature resistance test at 200° C. ± 2° C., 4 h | the coating film is intact, without bubbles or peeling |
| 6 | fungus resistance, 28 d | 0 class |
| 7 | peel test (peel off at room temperature after 200° C./4 hours) | good peelability |
| 8 | salt-fog test, 500 h | the coating film is intact, without bubbles or peeling |

Comparative Example 1

A high-temperature resistant, peelable and anti-corrosion coating is composed of the following raw materials in parts by weight: in component A, 100 parts of fluororubber L728A, 20 parts of fumed silica, 10 parts of quartz powder, 5 parts of mica flake, 5 parts of talcum powder, 7 parts of zinc phosphate, 1 part of carbon black, 1 part of antifungal agent KEPUYIN-M27, 1 part of DS-F20 wetting dispersant, and 34 parts of propylene glycol methyl ether acetate; in component B, 20 parts of bisphenol AF (2,2-bis(4-hydroxyphenyl)hexafluoropropane) and 100 parts of propylene glycol methyl ether acetate.

The preparation method of the high-temperature resistant, peelable and anti-corrosion coating includes the following steps:
S1: adding fluororubber L728A, fumed silica, quartz powder, mica flakes, talcum powder, zinc phosphate, carbon black, and propylene glycol methyl ether acetate into a high-speed mixer and mixing evenly without agglomeration;
S2: pouring the evenly mixed coating material into a basket mill and grinding the coating material to a fineness of 40 μm;
S3: adding antifungal agent and wetting dispersant and mixing evenly to obtain component A of high-temperature resistant, peelable and anti-corrosion coating;
S4: mixing bisphenol AF (2,2-bis(4-hydroxyphenyl)hexafluoropropane) with propylene glycol methyl ether acetate using a high-speed mixer to obtain component B of the high-temperature resistant, peelable and anti-corrosion coating;
S5: mixing 100 parts by weight of component A with 10 parts by weight of component B evenly, applying by brush coating, air spraying, or high-pressure airless spraying, and curing at a high temperature of 160° C. for 2 hours after coating, so as to obtain a high-temperature resistant, peelable and anti-corrosion coating.

Performance tests were conducted on the coating prepared in Comparative example 1. The testing method refers to the testing method in Embodiment 1. The test results are shown in Table 8:

TABLE 8

| Number | Experimental project | Test result |
|---|---|---|
| 1 | coating film appearance | white |
| 2 | tensile strength at break, MPa | 8.4 |
| 3 | elongation at break, % | 395 |
| 4 | water resistance test at 23° C. ± 2° C., 24 h | the coating film is intact, without bubbles or peeling |
| 5 | high-temperature resistance fungus resistance test at 200° C. ± 2° C., 4 h | the coating film is intact, without bubbles or peeling |
| 6 | fungus resistance test, 28 d | 0 class |
| 7 | peel test (peel off at room temperature after 200° C./4 hours) | unable to peel off |
| 8 | salt-fog test 500 h | the coating film is intact, without bubbles or peeling |

The difference between Comparative Example 1 and Embodiment 1 is that no adhesion modifier was used. After 200° C./4 h, the coating of Comparative Example 1 could not be completely peeled off from the substrate, and the peelability decreased. It indicates that the adhesion modifier of the present disclosure improves the peelable properties of the coating, so that it can be peeled off the substrate completely.

What is claimed is:

1. A peelable and anti-corrosion coating composition, wherein the coating composition comprises component A and component B;
the component A comprises film-forming substance, pigment and filler, adhesion modifier, auxiliary agent, and solvent A;
the component B comprises vulcanizing agent and solvent B;
the component A comprises the following components in parts by weight:
the film-forming substance 100 parts by weight;
the pigment and filler 25 to 55 parts by weight;
the adhesion modifier 0.1 to 3 parts by weight;
the auxiliary agent 0.5 to 5 parts by weight;
the solvent A 20 to 50 parts by weight;
the component B comprises the following components in parts by weight:
the vulcanizing agent 10 to 50 parts by weight;
the solvent B 100 parts by weight;
a mass ratio of the component A and the component B is 100: (1-15);
the film-forming substance is fluororubber;
the adhesion modifier is a mixture of expandable microsphere and polytetrafluoroethylene micro powder, with a mass ratio of 10: (1-4);
the expandable microsphere has a core-shell structure, with thermoplastic polymer as a shell and liquid alkane gas encapsulated inside; a diameter range of the expandable microsphere is 10-100 pm.

2. The high-temperature resistant, peelable and anti-corrosion coating according to claim 1, wherein:
the component A comprises the following components in parts by weight:

| | |
|---|---|
| the film-forming substance | 100 parts by weight; |
| the pigment and filler | 30 to 50 parts by weight; |
| the adhesion modifier | 0.5 to 2 parts by weight; |
| the auxiliary agent | 1 to 3 parts by weight; |
| the solvent A | 25 to 40 parts byG weight; |
| the component B comprises the following components in parts by weight: | |
| the vulcanizing agent | 15 to 40 parts by weight; |
| the solvent B | 100 parts by weight. |

3. The high-temperature resistant, peelable and anti-corrosion coating according to claim 1, wherein a mass ratio of the component A and the component B is 100: (2-10).

4. The high-temperature resistant, peelable and anti-corrosion coating according to claim 1, wherein the pigment and filler comprises reinforcing filler and anticorrosive filler;
the reinforcing filler is at least one of quartz powder, fumed silica, mica powder, mica flake, calcium carbonate, barium sulfate, titanium dioxide, kaolin, dolomite, wollastonite, carbon black, and phthalocyanine blue;
the anticorrosive filler is at least one of talc powder, zinc oxide, zinc phosphate, and organic bentonite.

5. The high-temperature resistant, peelable and anti-corrosion coating according to claim 1, wherein the auxiliary agent comprises wetting dispersant and antifungal agent.

6. The high-temperature resistant, peelable and anti-corrosion coating according to claim 1, wherein the vulcanizing agent is at least one of bisphenol AF (2,2-bis (4-hydroxyphenyl)hexafluoropropane), hydroquinone, dicumyl peroxide, and 2,5-dimethyl-2,5-di (tert-butylperoxy)hexane.

7. The high-temperature resistant, peelable and anti-corrosion coating according to claim 1, wherein:
the solvent A is at least one of propylene glycol methyl ether acetate, xylene, and butyl acetate;
the solvent B is at least one of propylene glycol methyl ether acetate, xylene, and butyl acetate.

8. A preparation method of the high-temperature resistant peelable anti- corrosion coating according to claim 1, wherein the preparation method comprises:
mixing the components of the component A according to the specified parts by weight to obtain the component A; mixing the components of the component B according to the specified parts by weight to obtain the component B, and mixing the component A and the component B according to the specified dosage to prepare the high-temperature resistant peelable anti-corrosion coating.

* * * * *